April 18, 1933.   J. J. ZELENKA   1,904,845

METHOD OF FORMING MOLDED ARTICLES

Filed Jan. 2, 1929

Inventor:
Joseph J. Zelenka
By H. A. Pattison Atty.

Patented Apr. 18, 1933

1,904,845

UNITED STATES PATENT OFFICE

JOSEPH JAMES ZELENKA, OF LA GRANGE, ILLINOIS, ASSIGNOR TO WESTERN ELECTRIC COMPANY, INCORPORATED, OF NEW YORK, N. Y., A CORPORATION OF NEW YORK

METHOD OF FORMING MOLDED ARTICLES

Application filed January 2, 1929. Serial No. 329,811.

This invention relates to a method of molding articles, and more particularly to a method of molding articles from phenol plastic and similar materials whereby such articles may be produced while preserving their original finish.

Objects of the invention are to provide an improved method whereby articles may be produced more economically and efficiently; and to improve the appearance and uniformity of articles molded from phenol plastic and similar materials.

The manufacture of molded articles from phenol plastic and similar materials ordinarily involves the simultaneous application of pressure and heat, followed by a cooling step while maintaining the pressure. Where such a process is performed with polished dies, an autogenous outer coating or integument is formed on the article which greatly enhances its appearance. In molding plastic articles of various shapes in the past, a thin fin has unavoidably been formed at the parting line between the molding die members, and particularly where this fin was formed on a curved surface it has been difficult to remove it without marring the autogenous finish of the adjacent surfaces, since a grinding operation was necessary to eliminate the pits and irregularities formed at the point where the fin was removed, and this grinding operation usually marred the adjacent portions of the surface with the result that all or a great portion of the entire surface of the article had to be re-polished. Since any finish obtained by polishing operations is inferior both in appearance and durability to the gloss formed by the polished molds, the appearance of the molded parts suffered, and the work of re-polishing made the manufacture of such parts unduly expensive. Also, varying amounts of material were necessarily removed in eliminating the pits and irregularities, with the result that the shape of the finished articles varied considerably.

In the present invention, the above disadvantages are avoided by shaping the mold in such a manner as to form a ridge at the parting line between the die members, with the fin projecting from the ridge in such relation that it may be removed by the usual grinding tools without marring the finish of the remainder of the articles.

The invention will be more fully understood from the following description, taken in connection with the appended drawing, in which Fig. 1 is a sectional view of an apparatus for molding articles in accordance with the invention, showing the handle of a telephone hand set being formed therein;

Figure 1:
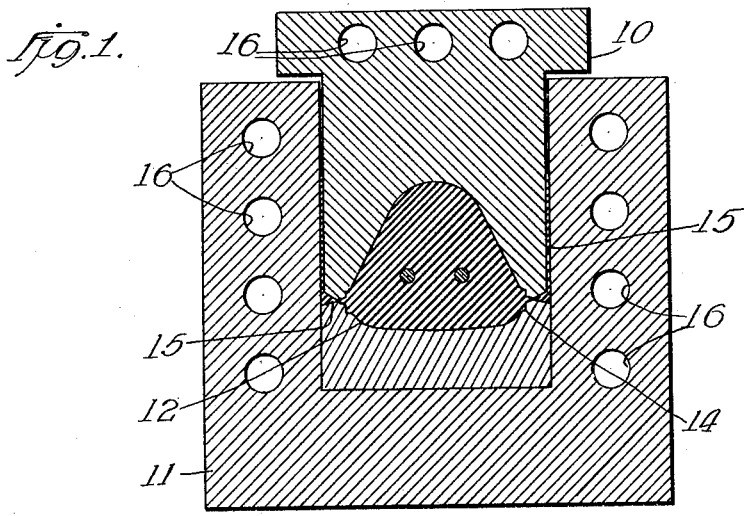
Figure 4:
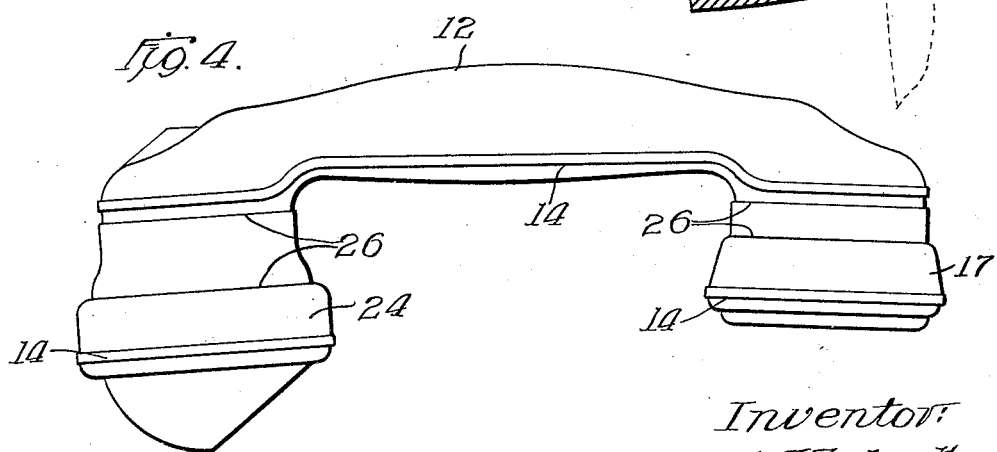
Fig. 4 is an elevation of an assembled hand set formed in accordance with and embodying the invention.

The invention is illustrated, and will be described, with specific reference to a telephone hand set, but it will be understood that it may be employed in making a great variety of other molded articles. In the drawing, the reference numerals 10 and 11 designate, respectively, upper and lower die members, preferably provided with heating and cooling passages 16 and having highly polished working surfaces adapted to mold a handle 12 of a telephone hand set. At the parting line between the die members is formed a continuous recess shaped to form a ridge 14 which, as best seen in Fig. 4, extends continuously around the periphery of the handle at the line of its greatest lateral extent in substantial parallelism with the lower surface of the handle. The ridge, as shown in Fig. 3, has a base portion 18 of approximately rectangular or trapezoid cross-section, upon which is formed a tapering portion 19 from which extends a fin as indicated at 15 in Fig. 1.

Figures 2, 3:
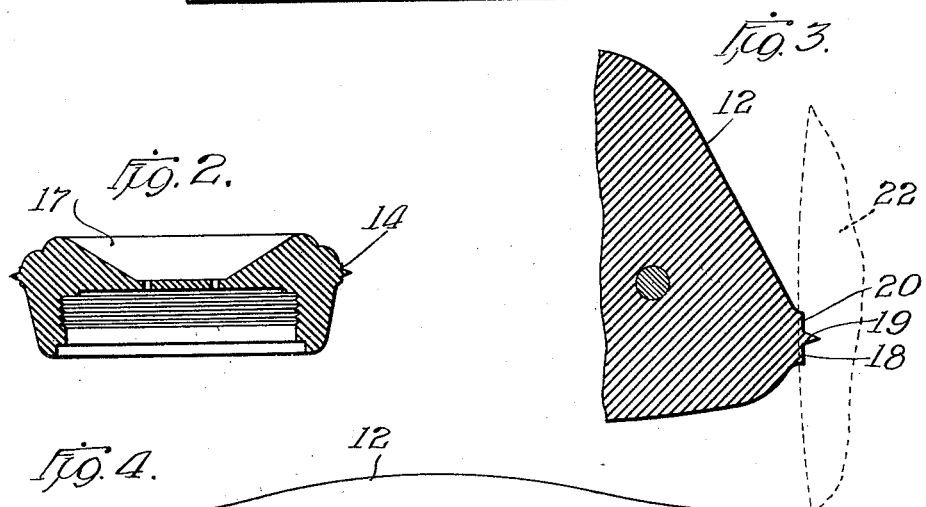
Fig. 2 is a sectional view of a receiver cap of a telephone hand set formed in accordance with the invention.
Fig. 3 is a fragmentary sectional view showing the manner of removing the fin from the molded part.

The receiver cap 17 shown in Fig. 2 has a similar ridge 14 which is formed in molding and extends continuously around the greatest periphery of the ring in parallelism with the lower surface thereof, and the transmitter cap 24 shown in Fig. 4 is formed in a similar manner.

In practicing the invention, the article is subjected to the usual molding operations, preferably comprising heat and pressure. When the molded article is removed from the mold, the fins 15 are removed by breaking them off, the outer edge of tapered portion 19 forming a line of weakness at which the break will usually occur. The outer surface 20 of the ridges 14 is then smoothed by grinding it down as indicated in Fig. 3, a rotary stone 22 or other suitable abrasive apparatus being used, and followed if desired by a buffing or polishing operation. This results in the surface 20 receiving a finish which may be considerably duller than the native gloss of the rest of the molded article, but inasmuch as the ridge is symmetrically placed with respect to the remainder of the article it forms a regular design which in no way detracts from the appearance of the article. This grinding and polishing, being performed on a raised surface, need not mar the adjacent surfaces of the article. Finally, the surface 20 may, if desired, be finished by applying a suitable stain or varnish, in which case no buffing or polishing is necessary.

When the handle 12, receiver cap 17 and transmitter cap 24 are assembled, the arrangement of the ridges 14 is such that they are in substantial parallelism to each other and to the structural division lines 26 of the instrument, which arrangement causes them to blend into the lines of the general design in such a manner that they do not detract from, but rather add to, the appearance of the assembled instrument.

Various modifications may be made in the method herein disclosed without departing from the spirit of the invention as defined in the following claims.

What is claimed is:

1. The method of producing a molded article of ornamental appearance which comprises molding the article in a mold having a recess located within the article forming cavity mold at the parting line thereof to form a ridge around the article with a fin of excess material integral therewith, holding the article in the mold until the material thereof is completely finished and set, removing the article from the mold, and removing the fin of excess material and a part of the ridge.

2. The method of producing a molded article of ornamental appearance which comprises molding the article in a mold having a recess located within the article forming cavity mold at the parting line thereof to form a ridge around the article with a fin of excess material integral therewith, holding the article in the mold until the material thereof is completely finished and set, removing the article from the mold, removing the fin of excess material and a part of the ridge, and polishing the new surface of the ridge thus formed.

In witness whereof, I hereunto subscribe my name this 24th day of December A. D. 1928.

JOSEPH JAMES ZELENKA.